Oct. 20, 1964  F. E. CHANCELLOR ETAL  3,153,547
HYDRAULICALLY RELEASABLE CASING CONNECTOR
Filed Aug. 11, 1960  2 Sheets-Sheet 1
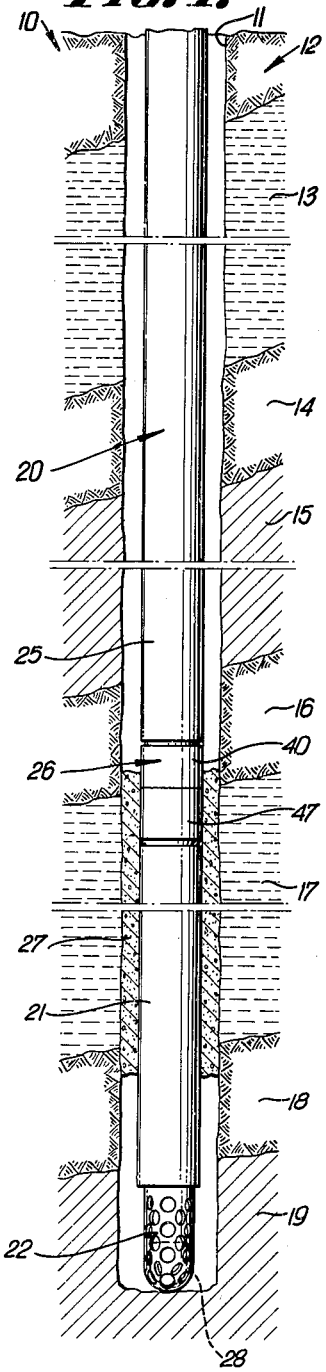
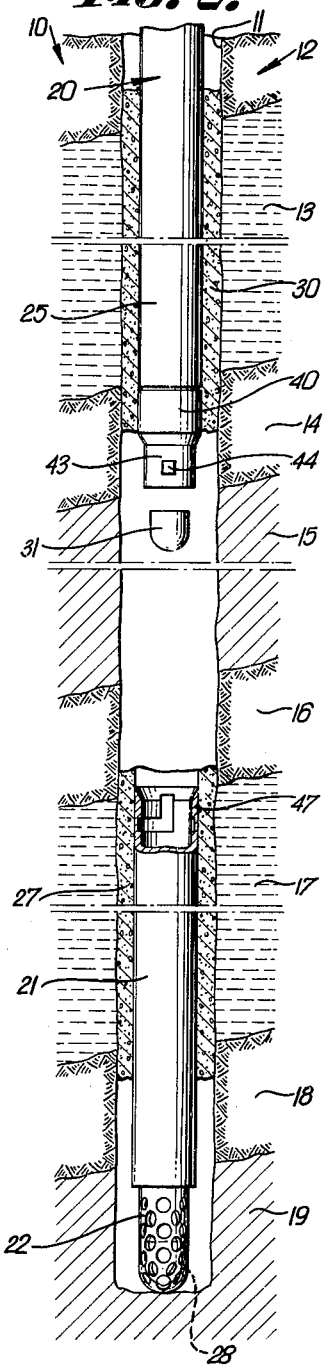
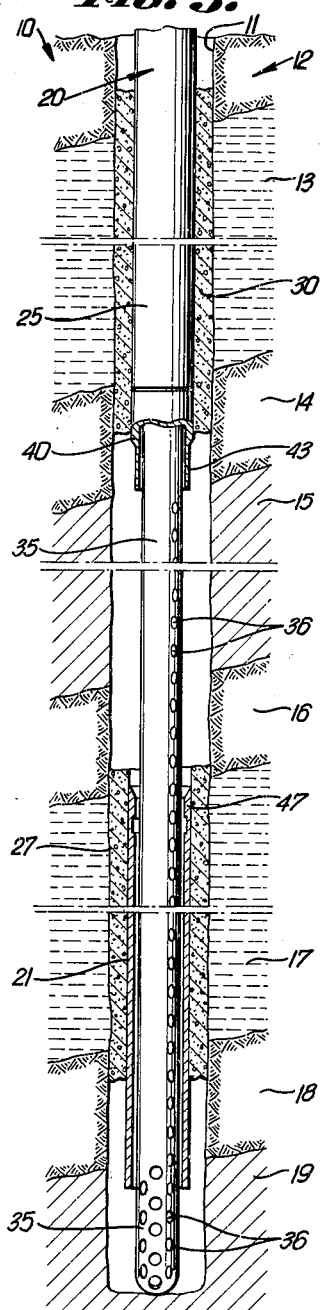
INVENTORS.
FORREST E. CHANCELLOR
ROBERT O. CHANCELLOR
BY
ATTORNEY.

Oct. 20, 1964

F. E. CHANCELLOR ETAL 3,153,547

HYDRAULICALLY RELEASABLE CASING CONNECTOR

Filed Aug. 11, 1960

INVENTORS
FORREST E. CHANCELLOR
ROBERT O. CHANCELLOR
BY
ATTORNEY.

United States Patent Office 3,153,547
Patented Oct. 20, 1964

3,153,547
HYDRAULICALLY RELEASABLE CASING
CONNECTOR
Forrest E. Chancellor and Robert O. Chancellor, both of
2917 Pierce Road, Bakersfield, Calif.
Filed Aug. 11, 1960, Ser. No. 48,933
5 Claims. (Cl. 285—18)

This invention relates to the deep oil well boring art and particularly to a novel method of and apparatus for cementing off water bearing strata above and below an oil bearing stratum to prevent water mixing with the oil withdrawn from the well.

A method commonly practiced for attaining this end involves extending a casing into the bore of the well which casing has a restricted diameter where it passes through the oil stratum, and discharging liquid cement from the lower end of the casing, this cement flowing upwardly between the casing and the bore to cement off all three strata, including the two water strata and the oil stratum located therebetween. A drilling tool is now extended down inside the casing, after the cement hardens, this tool being too large to pass through the casing section of smaller diameter, and, by rotation of this drill, this section is drilled out. An expansive reamer is now lowered on the drill stem to cut out the cement deposited in the oil bearing stratum just outside said casing section. A perforated production casing is then installed in the well for pumping oil from the oil bearing stratum.

The oil bearing stratum involved in such a cementing operation sometimes has a depth of over 100 feet, and the loss of a section of tubing of this length and the cost of drilling this out, and then reaming out the cement throughout the depth of the oil bearing stratum in question not infrequently amounts to over $4,000.00. A further disadvantage is the practical certainty that substantial portions of the cement allowed to harden in the well bore in the oil zone, are not removed by the reaming step and remain to impede the flow of oil from said zone.

It is an object of the present invention to provide a method and apparatus for cementing oil wells which may be substituted for the method commonly used and above described and which will achieve the desired end much more efficiently, at much less cost and without delivering cement into an oil zone thus hazarding impairment of its productivity.

It is a further object of the invention to provide a novel method and apparatus for cementing oil wells which may be used with equal effectiveness in cementing off two water bearing strata disposed above and below an oil bearing stratum and providing means for production of oil not only from said stratum but also from a second oil bearing stratum located below the lower of said water bearing strata.

The method of the present invention involves the separation of the casing through which the cementing operation is being performed so as to leave a lower section of the casing in place spanning the lower of two water bearing strata after the latter has been cemented off and then raising the balance of the casing a sufficient distance to place the lower end of said balance above the oil bearing stratum (the upper oil bearing stratum if there are two of these) and then cementing off the upper of the two aforementioned water bearing strata. This method requires a tubular connector to join together the lowermost section of the casing and the balance of the casing to which said section is attached.

It is a further object of the invention to provide such a connector by which the lower section of said casing may be lowered into the well while connected to the balance of the casing, said coupling incorporating a means for releasing said section from the upper portion of the casing when the point arrives in the performance of the cementing method of the invention that requires this.

It is still another object of the invention to provide such a section releasing connector which is locked against separation and is responsive to passage of a cementing plug therethrough for the relaxing of said locking means and thus rendering said coupling separable as by a partial rotation of the upper portion of the casing.

It is yet a further object of the invention to provide such a section releasing connector having a smooth internal bore which is equal to or greater than the minimum interior diameter of the casing string and which has an external diameter which is no greater than the maximum external diameter of the casing string.

Yet another object of the invention is to provide such a section releasing connector which forms a sealed, liquid-tight connection between adjacent casing ends connected thereby yet is readily rotatable to accomplish the separation of said connection when this is desired.

In searching for oil in unproven areas, ordinarily known as wildcatting, operators find it necessary to run a series of tests on the formation at different depths. Each of these tests involves the running of a casing into the well with a packer on the lower end adapted to seat against the formation of the well bore. When the local conditions of the formation where the packer is expanded are such that this will not seat, not only does a poor test result but in some instances the string of casing is lost.

Yet another object of the invention is to provide such a releasing connector which may be suspended on the lower end of a the drill pipe to support one joint of casing hanging downwardly therefrom and will permit the cementing of said casing section at any location in the well in which it is desired that a test be made after which the drill pipe will be disconnected from the casing section and withdrawn from the well. Thus a positive test can be made of the area just above the cemented-off section of the bore without restricting the bore of the well for further drilling.

Another object of the invention is to provide such a releasing connector, two of which can be installed in one string of casing so as to permit accomplishing three jobs of cementing in one operation.

The manner of accomplishing the foregoing objects as well as further objects and advantages will be made manifest in the following description taken in connection with the accompanying drawings in which:

FIG. 1 is a diagrammatic view of a preferred embodiment of the apparatus of the invention being utilized in the performance of an initial cementing step of the method of the invention.

FIG. 2 is a view similar to FIG. 1 and illustrating the apparatus of the invention being employed in the performance of a second cementing step of the method of the invention.

FIG. 3 is a view similar to FIG. 2 and illustrates the installation of a perforated production casing in the well (for the purpose of producing oil from said well) following the completion of the cementing method of the invention.

Figure 4:
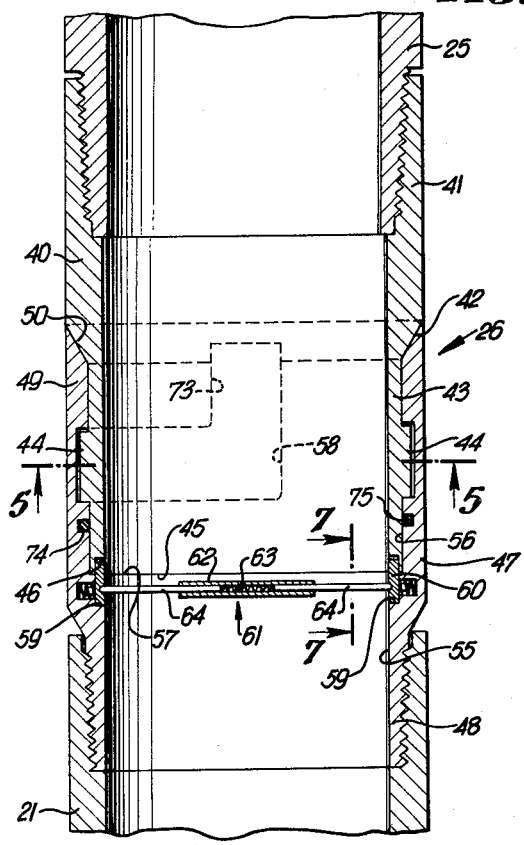
FIG. 4 is an enlarged vertical sectional view taken through the section releasing connector of the apparatus of the invention and is taken in the same plane as FIG. 1 showing said coupling in elevation.
Figure 6:
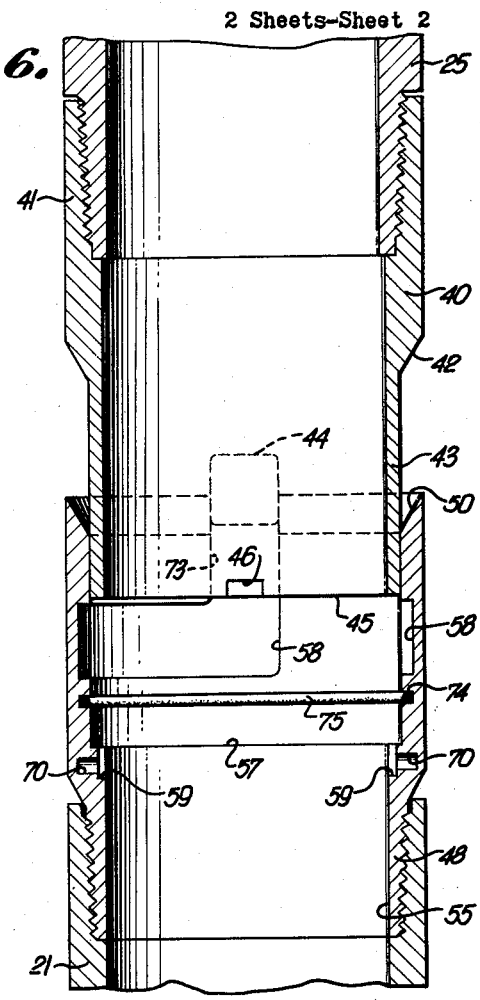
FIG. 6 is a view similar to FIG. 4 and shows the upper element of the connector being lifted axially out of the lower element thereof to accomplish the separation of said connector.
Figure 5:
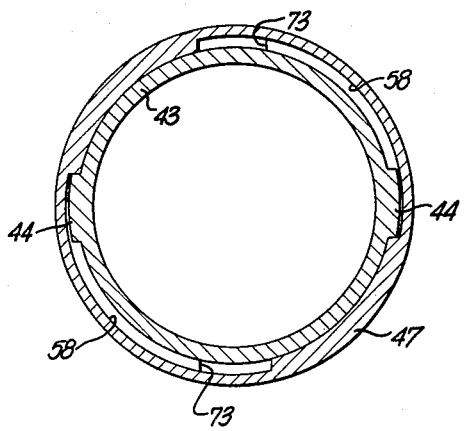
FIG. 5 is a cross-sectional view taken on the line 5—5 of FIG. 4 but illustrates the upper element of the connector rotated 90° from the position in which it is shown in FIG. 4 so as to be ready to be lifted vertically and thus separated from the lower element of said connector.
Figures 7, 8:
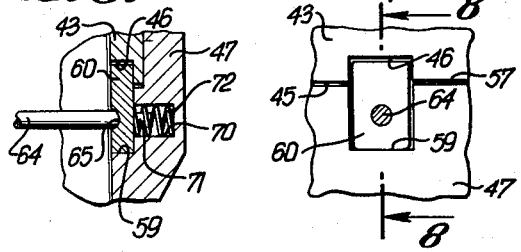
FIG. 7 is an enlarged detailed sectional view taken on the line 7—7 of FIG. 4 and showing the locking means which normally retains the upper and lower elements of the connector against rotation relative to each other.
FIG. 8 is a detailed vertical sectional view taken on the line 8—8 of FIG. 7.

Referring specifically to the drawings, a preferred mode of performing the method of the invention is diagrammatically illustrated in FIGS. 1, 2 and 3. These views represent a well 10 including a bore 11 drilled in the earth 12 so as to penetrate an upper water bearing stratum 13, an intermediate solid stratum 14, an oil bearing stratum 15, an intermediate solid stratum 16, a water bearing stratum 17, an intermediate solid stratum 18, and an oil bearing stratum 19.

The performance of the method of the invention requires a cementing casing 20 which is adapted to be extended from the upper surface of the well 10 downwardly through the bore 11 through the stratum 18 and into the stratum 19, and this casing must have a lower section 21, preferably provided with a perforated shoe 22 at its lower end, the section 21 being connected to the balance of the casing 20 (referred to hereafter as the upper section 25) by a releasing connector 26 which is separable during the cementing method of the invention to detach the casing section 21 from the section 25.

The invention embraces a preferred form of releasing connector 26 although any means which will perform the functions of the connector 26 may be employed in the apparatus used in performing the cementing method of the invention.

The preferred form of the method of the invention starts with the insertion of the casing 20 into the well bore 11 until the perforated shoe 22 thereof penetrates the stratum 19 as shown in FIG. 1. At the time this is done the bore 11 is filled with a fluid mass of rotary mud which enters the shoe 22 to fill the casing 20. A charge of liquid cement 27 is now introduced into the upper end of the casing 20 on top of the mud contained therein and after a cementing plug 28 is inserted in the casing on top of the charge of cement, rotary mud is pumped downwardly on top of the plug to force this charge of cement downwardly through the connector 26 and the casing section 21 and out of the bottom of the latter, from which point the cement follows the line of circulation of the rotary mud upwardly between the bore 11 and the casing 20 until this charge 27 of liquid cement forms a complete sheath extending from the stratum 18 to the stratum 16 and completely cementing off the water stratum 17 from the bore 11 of the well 10.

As the plug 28 inserted into the casing 25 to follow cement charge 27 down the casing passes through the connector 26 it trips a means provided in this coupling (to be described later) which facilitates the separation of upper and lower elements of the coupling permitting the section 25 of casing 20 to be lifted upwardly leaving the lower section 21 of said casing embedded in the cement 27. The upper section 25 of casing 20 is withdrawn upwardly as shown in FIG. 2 until its lower end is located above the oil bearing stratum 15 and somewhere within the solid stratum 14 of the well 10.

Rotary mud fills the upper section 25 of casing 20 at the time of its separation from the section 21 and the bore 11 of the well where this passes through oil bearing stratum 15 is likewise also filled with rotary mud. A charge of liquid cement 30 is now delivered into the upper end of casing section 25 followed by a plug 31 and is circulated downwardly out of the lower end of section 25 and upwardly to fill the portion of the bore 11 which extends through the water bearing statum 13 so as to form an imperforate sheath of cement sealing off this stratum from the rest of the bore 11.

After the cement charges 27 and 30 has thoroughly set, the shoe 22, the cementing plug 28 and the plug 31 are drilled out and removed upwardly through the casing section 25, and a perforated production casing 35 is installed downwardly in the two casing sections 25 and 21 as shown in FIG. 3. This casing 35 has perforations 36 which communicate with both upper and lower oil bearing strata 15 and 19 and permits oil to be pumped upwardly from both of these strata simultaneously.

Referring now to FIGS. 4 to 8 inclusive, the preferred form of the casing section releasing connector 26 of the apparatus of the invention will now be described. This connector is tubular in form and includes a male element 40 having an internal threaded box end 41 which connects to casing section 25 and an annular external beveled face 42 from the inner edge of which a tubular sleeve 43 extends downwardly. Formed outwardly on the sleeve 43 is a pair of diametrically opposite lugs 44 which are fairly shallow and preferably formed integrally with the element 40 by a milling operation. Formed at diametrically opposite points in the lower edge 45 of the sleeve 43 are rectangular notches 46, the purpose of which will be made clear hereinafter.

The connector 26 also includes a female element 47 having an externally threaded pin end 48 which connects with the casing section 21 and which provides a cylindrical tubular receptacle 49 having an annular concave beveled face 50 at its upper end which matches with and closely fits the annular externally beveled face 42 on element 40.

The element 47 has an internal bore 55 and a counterbore 56 forming an annular shoulder 57 against which the lower end of sleeve 43 fits when the connector 26 is assembled. The bore 56 makes a close rotatable fit with the sleeve 43 and has formed therein a pair of diametrically opposed square cornered right-angled lug receiving grooves 58 which receive the locking lugs 44 during the insertion of sleeve 43 axially into the receptacle 49 and accommodate these lugs, following said insertion, when the element 40 is rotated 90° counterclockwise to its finally assembled relation with the female element 47 as shown in FIG. 4. Formed in the bore 55 and opening on the shoulder 57 directly opposite the notches 46 when the connector 26 is assembled is a pair of deep notches 59 which unite with the notches 46 to form pockets which receive a pair of rectangular locking keys 60 which fit said pockets to prevent inadvertent rotation of the elements 40 and 47 out of assembled relation. These keys are held in place by a telescopic spanner 61 including a sleeve 62 housing an expansive spring 63 and receiving rods 64 in its opposite ends. Each of the keys 60 has a recess 65 into which one of the rods 64 extends, the spring 63 maintaining a pressure against the keys 60 holding these in the pockets formed by notches 46 and 59 until the spanner 61 is removed from its spanning relation with said keys.

Each of the notches 59 is deepened by a blind bore 70 and each of the keys 60 has a tit 71 which extends into said bore when the keys 60 are assembled on the connector 26 in locking relation, the tits 71 centering the keys 60 on expansive coil springs 72 during the assembly of the locking means so that these springs may be compressed into bores 70 and confined there in expansive pressural relation with the keys 60. Thus, whenever the spanner 61 is removed from spanning relation with the keys 60 the latter will be discharged from the pockets 59 and 46 by the action of springs 72, thereby freeing elements 40 and 47 of connector 26 for a free 90° clockwise rotation of element 40 relative to element 47 which brings lugs 44 in alignment with the axial portions 73 of the grooves 58.

Formed in the bore 56 just below the grooves 58 is an annular recess 74 in which an O-ring 75 is confined to make a liquid seal between elements 40 and 47 when these are assembled in the connector 26.

When the cementing casing 20 is assembled for insertion into the well bore 11 as shown in FIG. 1 the sections 21 and 25 thereof are connected together by the connector 26 and the latter is assembled and locked in assembled condition as shown in FIG. 4. The liquid cement 27 when delivered downwardly through the connector 26 and lower casing section 21, readily flows around the spanner 61 and continues to flow downwardly out of the lower end of casing section 21 and then upwardly to cement off water bearing stratum 17 as already described. When the upper end of this charge of cement passes the spanner 61, the cementing plug 28, which separates this cement charge from the rotary mud above it, engages the spanner 61, forcing this away from between the keys 60 so that the latter are impelled inwardly by the spring 72 out of the pockets 46 and 59 thus unlocking the separate elements 40 and 47 of the connector 26 so that as soon as the cementing of the lower water stratum 17 has been completed as shown in FIG. 1 the upper section 25 of the cementing casing is given a quarter turn clockwise thus bringing the lugs 44 into alignment with the axial groove portion 73, after which the casing section 25 is lifted directly upwardly, leaving the lower casing section 21 embedded in the cement 27.

The balance of the cementing method by which water bearing stratum 13 is cemented off, is then performed and when the two cementing operations are completed and the cement has hardened, the lower and upper casing sections 21 and 25 both remain permanently cemented in place in the well 10 as shown. As already noted, this is followed by the cleaning out of all obstructions remaining in casing 20 and the installation of a perforated oil production tubing string 35 downwardly through the two casing sections 25 and 21 (in the order named) so that oil may be produced through the tubing string 35 from both the upper oil bearing stratum 15 and the lower oil bearing stratum 19.

It is to be noted that in the insertion of tools down through the casing sections 25 and 21 to clear these of cementing plugs and other debris which might interfere with the oil production, and then later inserting the perforated production casing string 35, those portions of the equipment which extend downwardly into the lower casing section 21 are guided thereinto by the concave beveled annular face 50 which is presented upwardly to such equipment at the upper end of the female element 47 of the connector 26 which remains mounted on the upper end of the lower casing section 21.

Among the advantages possessed by the present invention the most notable are the provision it affords for double cementing operations both below and above an oil bearing stratum without requiring a tubing section of smaller diameter which is coextensive in vertical depth with said oil bearing stratum. It also eliminates the previously unavoidable loading up of the oil bearing stratum with cement, a certain portion of which tended to penetrate the oil bearing zone and close up the pores thereof. Furthermore the invention eliminates the need for drilling out this small diameter section of casing and also drilling out the cement delivered to the oil bearing stratum.

Another important use of the releasing connector 26 of the invention is in facilitating a cementing operation where this is necessary to permit a test to be run of the formation in a well during the process of drilling. To do this, the upper element 40 of the connector 26 is mounted on the lower end of a drill string while the lower element 47 of the connector has a section of casing suspended therefrom such as the casing section 21 shown in the drawings. The drill string is then run into the well to the desired depth to locate the casing section exactly in the place where it is desired to cement this into the well bore. A charge of liquid cement is then run downwardly through the drill string, the connector 26, and the casing section 21 suspended therefrom to accomplish delivery of this cement into the zone of the well bore surrounding said casing section, exactly as hereinabove described.

The passage of the cementing plug through the connector 26 displaces the spanner 61 so that at the conclusion of the cementing operation a 90° rotation of the drill string will unlock the connector 26 and permit the drill string to be withdrawn from the well, leaving the casing section 71 cemented in place as desired. To make the test of the well bore directly above the casing section thus cemented in, it is now only necessary to run a testing tool into the well with a packer at the lower end thereof which readily makes a sealing fit with the internally beveled face 50 of the connector element 47 which remains mounted on the upper end of casing section 21.

When this test has been completed the drilling of the well may be resumed by tools extended downwardly through the casing section 21 thus cemented in place in the well bore.

While the right-angled grooves 58 formed in the receptacle 49 of the female element 47 of the connector of the invention are shown in the drawings as disengageable by a 90° clockwise rotation of the male element 40 of the connector, the connectors 26 are made in two styles, one with the grooves 58 as shown, and the other with the grooves 58 turning horizontally in the opposite direction from the upright portion 73 thereof so that a connector 26 of the latter style is disconnected by a 90° counterclockwise rotation of the male element 40.

The reason for making connectors 26 in two styles as above noted, is to permit a pair of these connectors in a casing with the connectors spaced apart by a section of casing and with one of these connectors being of one of these styles and the other connector of the other style. With such an apparatus three cementing jobs may be performed consecutively in one general operation without withdrawing the casing from the well. This is possible because rotation of the main casing string to separate the lower of the two connectors 26 has no effect on the upper connector 26 so that after the second cementing operation a reverse rotation of 90° of the main casing will disconnect the upper of the two connectors 26 and permit the main casing to be withdrawn upwards and halted at the desired location for performing the third cementing job.

When using tandem connectors 26 in the manner just described, the spanners 61 of both of these connectors are displaced by the cementing plug following the cement charge of the first cement job. The displacing of these spanners however merely unlocks the connectors so that when the upper element 40 of each is rotated 90° in the proper direction for that particular style of connector, it may be lifted upwardly and will freely separate from the lower element of that connector. Where the connector is of the style that requires a clockwise rotation of 90° of the upper element thereof to prepare the connector for axial separation, a counterclockwise rotation of the upper element merely effects a like rotation of the lower element of the connector and the connector is still locked by the lugs 44 against axial separation. This fact is what makes the triple cementing job in one operation described above possible.

It might thus be observed that while the keys 60 and associated elements for locking the male and female elements of the connector 26 against relative rotation is a valuable and possibly practically necessary element of the invention, it is not an absolutely necessary element as the connector 26 could be assembled with the rest of the apparatus and used in the performance of the method of the invention without these connectors being equipped with the locking keys 60. The only thing is that a high degree of care would have to be exercised when inserting the casing into the well to prevent relative rotation between the male and female elements of the connector prior to the accomplishment of the lower cementing job.

We claim:

1. In a hydraulically releasable tubular connector for adjoining sections of well casing, the combination of: a tubular female element attached to one section; a tubular male element attached to the other section, said elements having the same external diameter, and both having approximately the same inside diameter as said casing, said female element having an end portion thereof counterbored to provide a cylindrical thin-walled tubular receptacle the bottom end of which terminates at an annular internal shoulder, said male element having the outside diameter of an end portion thereof, of the same axial length as said receptacle, decreased to provide a cylindrical thin-walled tubular sleeve which is insertable axially into said receptable to make a fluid tight fit therewith and provide a central fluid passage connecting said casing sections; a pair of shallow diametrically opposed lugs provided externally on said sleeve, there being a pair of shallow diametrically opposed bayonet slots hollowed out internally from said receptacle to receive said lugs when said sleeve is inserted into said receptacle and to lock said sleeve against axial removal from said receptacle when said sleeve is rotated a quarter turn after said insertion; and locking means to prevent the uncoupling of said connector and including two pairs of matching recesses formed internally respectively in said annular shoulder of said female element and in the end of said male sleeve, said respective pairs of recesses being in axial alignment on opposite sides of the plane of said shoulder when said connector is coupled together as aforesaid, said latching means also including a pair of shallow blocks fitting respectively the spaces provided by said aligned pairs of recesses, and spanner means holding said blocks in place, but readily displaced by an object hydraulically propelled through said connector to free said blocks from said recesses whereby said sleeve may be reversely rotated in said receptacle and said connector uncoupled.

2. A tubular connector as recited in claim 1 wherein said diametrically opposed recesses formed internally in the end of said male sleeve are in axial alignment respectively with said lugs formed externally on said sleeve.

3. A tubular connector as recited in claim 1 wherein shallow holes are provided in said blocks into which opposite ends of said spanner means extends; and spring means embodied in said spanner means for expanding the latter lengthwise into said holes to apply a yieldable pressure holding said blocks in said recesses.

4. A tubular connector as recited in claim 1 wherein spring receiving pockets are formed in said female element behind each of said blocks; and expansive springs trapped in said pockets behind said blocks to propel said blocks out of said recesses immediately upon the displacing of said spanner means.

5. In a hydraulically releasable tubular connector for adjoining sections of well casing, the combination of: a tubular female element attached to one section and having a tubular receptacle; a tubular male element attached to another section and having a tubular sleeve which is insertable into said receptacle to make a fluid tight fit therewith and provide a central fluid passage through which a plug is adapted to be hydraulically propelled by a stream of liquid pumped downwardly through said casing and said connector; interlocking means uniting said elements against axial separation, said means being subject to disengagement by a given rotational movement between said elements which may be effected by rotation of the upper of said casing sections; locking means normally locking said elements against such rotational movement, said means comprising a pair of diametrically opposite recesses each of which is partially formed in one of said elements and partially in the other element, and a pair of blocks fitting snugly within said recesses; a linearly expansive spanner rod diametrally disposed in said passage, said blocks having shallow recesses for temporarily retaining opposite ends of said rod in expansive engagement with said blocks; and spring means for ejecting said blocks from said recesses when said spanner rod is displaced by a plug hydraulically propelled downwardly through said passage.

References Cited in the file of this patent
UNITED STATES PATENTS

| | | |
|---|---|---|
| 702,436 | Johnston | June 17, 1902 |
| 995,966 | Hill | June 20, 1911 |
| 1,113,556 | Hill | Oct. 13, 1914 |
| 1,431,426 | Robinson | Oct. 10, 1922 |
| 1,854,048 | Lauster | Apr. 12, 1932 |
| 2,138,156 | Halliburton | Nov. 29, 1938 |
| 2,145,512 | Hudson | Jan. 31, 1939 |
| 2,168,735 | Gilstrap | Aug. 8, 1939 |
| 2,407,983 | Harper | Sept. 24, 1946 |
| 2,436,525 | O'Donnell | Feb. 24, 1948 |
| 2,490,350 | Grable | Dec. 6, 1949 |
| 2,493,521 | Bermingham | Jan. 3, 1950 |
| 2,673,751 | Finch | Mar. 30, 1954 |
| 2,893,694 | Waggener | July 7, 1959 |